Dec. 13, 1955  M. G. BEKKER  2,726,904
ENDLESS TRACK

Filed Oct. 15, 1953  2 Sheets-Sheet 1

INVENTOR
Mieczyslaw G. Bekker

BY Bailey, Stephens & Huettig
ATTORNEYS

Dec. 13, 1955 M. G. BEKKER 2,726,904
ENDLESS TRACK
Filed Oct. 15, 1953 2 Sheets-Sheet 2

INVENTOR
*Mieczyslaw G. Bekker*

BY *Bailey, Stephens & Huettig*
ATTORNEYS

United States Patent Office 2,726,904
Patented Dec. 13, 1955

2,726,904

ENDLESS TRACK

Mieczyslaw G. Bekker, Washington, D. C., assignor to Her Majesty the Queen in the right of Canada as represented by the Minister of National Defence, Ottawa, Ontario, Canada Application October 15, 1953, Serial No. 386,148

4 Claims. (Cl. 305—10)

This invention relates to an endless track construction, and is particularly directed to the construction of the track links.

In my copending application Serial No. 376,657, filed August 26, 1953, for "Tractor Track," I have disclosed how an endless track can be constructed to give the maximum net tractive effort, i. e. draw-bar pull, for various types of soils. In particular, in said application I have shown that a so-called open-type of track construction in which the cleats are spaced a relatively great distance apart, is more efficient than the so-called conventional closed-type track in which the cleats are set very closely together.

The objects of the instant invention are to produce links which are of adequate strength, and are so arranged as to give sufficient support for the vehicle while maintaining the advantages of the open-type track construction.

In general, these objects are obtained by providing two types of links which are alternately set in the track. These links produce trackways for the buggy wheels, and are spaced closely enough so as to produce a small enough pitch so that they can go around the driving sprocket wheels without causing vibrations at higher speeds. Also the size of the driving sprocket wheels can be kept within practical limits. In one form of link the cleats are spaced outwardly of the buggy wheel trackways and are connected across the width of the track by a backbone. In the alternate link the cleat is disposed across the width of the track between the buggy wheel trackways. The links are connected either by hinge pins, or by a flexible band. Cushioned tread feet, composed of rubber or the like, are disposed beneath each link so that the track can run smoothly over a hard surface.

The means by which the objects of the invention are obtained are described more fully with reference to the accompanying drawings, in which.

Figure 1:
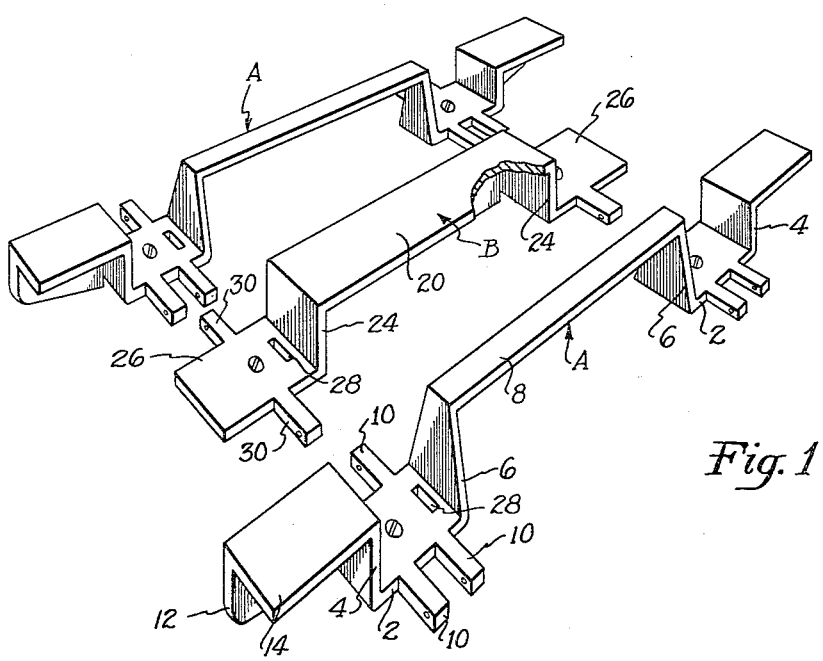
Figure 1 is an exploded view of the track construction.
Figure 2:
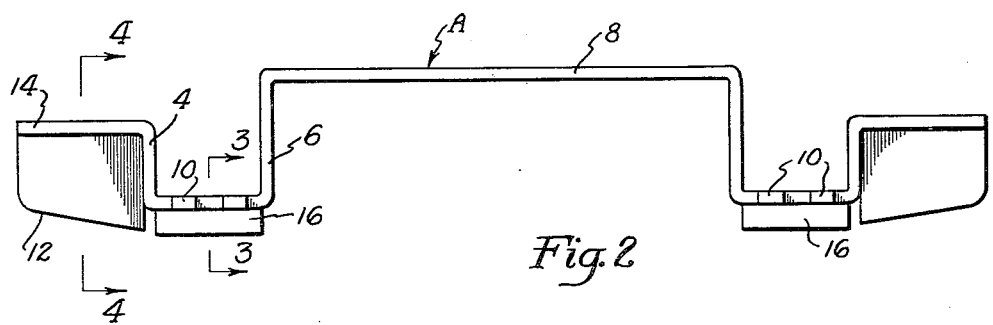
Figure 2 is a front elevational view of one form of link.
Figure 3:
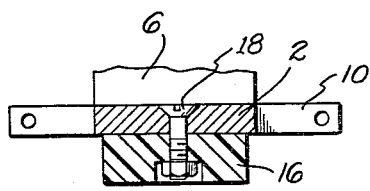
Figure 3 is a cross-sectional view on the line 3—3 of Figure 2.
Figure 4:
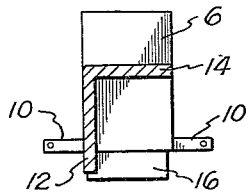
Figure 4 is a cross-sectional view on the line 4—4, Figure 2.
Figure 6:
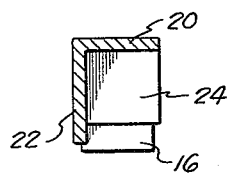
Figure 6 is a cross-sectional view on the line 6—6, Figure 5.
Figure 5:
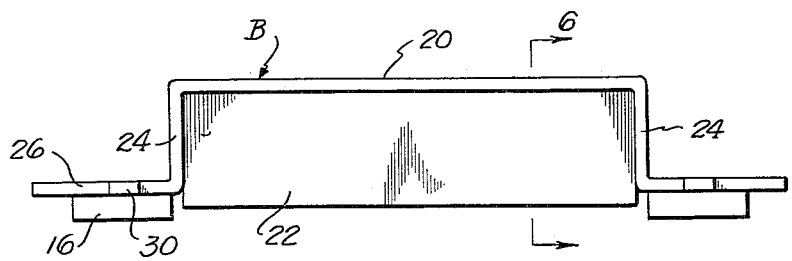
Figure 5 is a front elevational view of a second link.

In Figure 1 the links A are alternated with links B. Link A is composed of two channel-shaped elements having a bottom web 2 and upstanding flanges 4 and 6, respectively. Flanges 6 are connected by the backbone 8. This backbone, while shown as a flat plate, can be in any form to achieve the necessary strength and rigidity. For example, it may have the cross-sectional form of a channel, a tube, a T, or the like. It should be narrow in the horizontal plane in order to interfere as little as possible with the free area located between flanges 6.

The channel members form a portion of the trackway for the buggy wheels. Bottom web 2 has projections 10 extending therefrom forming hinge elements by means of which the link A can be connected to links B. Each flange 6 forms a sidewall of a guideway for the buggy and driving sprocket wheels.

Outwardly projecting from flanges 4 are outside cleats composed of a vertical flange 12 and a horizontal flange 14. Both these flanges are connected to the corresponding edges of flange 4, thus forming a very rigid structure.

A cushioned tread foot 16 is connected to the bottom web 2 by means of bolts 18 or the like. This foot extends slightly below the lower edge of flange 12, and forms a support for the link when the track is being operated over hard ground.

Alternate links B are composed of an inside cleat having a horizontal flange 20 and a depending vertical flange 22. This cleat extends across the middle of the track, and is co-extensive with backbone A. Preferably, as shown, flange 20 lies in a lower horizontal plane than does backbone 8. The ends of the cleat are closed in by vertical flanges 24. Horizontal flanges 26 extend outwardly from the lower edges of flanges 24, and flanges 26 lie in the same plane as bottom webs 2 of links A, and form additional portions of the buggy wheel trackway. Holes 28 in flanges 26 and bottom web 2, respectively, are provided in which the teeth of the driving sprocket engage to drive the track, if this type of track propulsion is chosen. Alternatively flanges 6 and 24 may serve as driving lugs engaging the corresponding elements of the sprocket. Flanges 26 are provided with footings 16 in the same way as described for link A. Hinge projections 30 extend from flange 26 to be connected to hinge projections 10 by ordinary hinge pins to complete the track.

Figure 7:
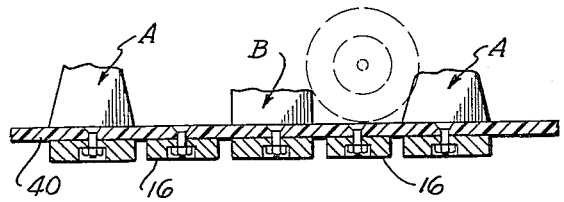
Figure 7 is a partial cross-sectional view showing the links connected by a flexible member.

In Figure 7 the links A and B are connected together by a flexible cable 40 instead of by the rigid hinge projections. This cable 40 may be a steel cable, a chain, or a strip of reinforced rubber. It forms the surface upon which the buggy wheels ride and is provided for this purpose with additional feet 16 between links A and B.

The track described has all the advantages of the open link track construction, while at the same time the individual links A and B can be made relatively light. The number of links is such that the pitch of the sprocket wheel does not need to be excessively large, although the links are close enough together so that the buggy wheels are supported substantially continuously over the ground engaging reach of the track.

Having now described the means by which the objects of the invention are obtained, I claim:

1. An endless track comprising first link members each composed of a pair of parallel spaced channel shaped elements adapted to form a part of a buggy wheel track, a non-ground bearing and non-tractive backbone member connecting the adjacent flanges of said elements, and outside cleat elements projecting outwardly, respectively, from each of said elements, said first members being alternated with second link members each composed of an inside cleat co-extensive with said backbone member and longitudinally spaced therefrom in the track, flanges extending outwardly, respectively from each end of said cleat, said flanges lying in the same plane as the bottom web of said channel shaped elements and forming additional parts of the buggy wheel track, and means for hingedly connecting the first and second members to each other.

2. An endless track as in claim 1, said hinge means further comprising pin connected hinges lying in the plane of the elements and flanges forming the buggy wheel track.

3. An endless track as in claim 1, hinge means further comprising flexible cables secured to said bottom webs and said flanges, respectively.

4. An endless track as in claim 1, further comprising cushioning footings secured to said bottom webs and said flanges, respectively, said footings extending downwardly further than the lower edges of said outside cleat elements and said inside cleats.

References Cited in the file of this patent

UNITED STATES PATENTS

| | | |
|---|---|---|
| 2,043,234 | Colby | June 9, 1936 |
| 2,043,235 | Colby | June 9, 1936 |
| 2,376,802 | Morse | May 22, 1945 |
| 2,389,156 | Knox | Nov. 20, 1945 |